US010730420B2

(12) United States Patent
Francois (10) Patent No.: US 10,730,420 B2
(45) Date of Patent: Aug. 4, 2020

(54) SEAT COVER (71) Applicant: Faurecia Automotive Seating, LLC, Auburn Hills, MI (US)

(72) Inventor: Aurelien Francois, Beverly Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 17 days.

(21) Appl. No.: 16/139,193

(22) Filed: Sep. 24, 2018

(65) Prior Publication Data
US 2020/0094717 A1 Mar. 26, 2020

(51) Int. Cl.
*B60N 2/60* (2006.01)
*B60N 2/58* (2006.01)

(52) U.S. Cl.
CPC ......... *B60N 2/6027* (2013.01); *B60N 2/6063* (2013.01); *B60N 2/5825* (2013.01)

(58) Field of Classification Search
CPC ... B60N 2/6063; B60N 2/6027; B60N 2/5825
USPC ............................................ 297/228.13, 229
See application file for complete search history.

(56) References Cited

U.S. PATENT DOCUMENTS

| 1,051,566 | A | * | 1/1913 | Dreher | B60N 2/6027 297/226 |
| 2,040,463 | A | * | 5/1936 | Brueckl | A47C 7/425 297/253 |
| 2,109,652 | A | * | 3/1938 | Emmey | B60N 2/6027 297/253 |
| 2,172,890 | A | * | 9/1939 | Phillips | B60N 2/6027 297/226 |
| 2,742,651 | A | * | 4/1956 | Ward | B60N 2/6027 5/98.1 |
| 2,811,199 | A | * | 10/1957 | Morrill, Jr. | B60N 2/14 297/226 |
| 2,833,341 | A | * | 5/1958 | Bornstein | B60N 2/7005 297/229 |
| 3,046,057 | A | * | 7/1962 | Smetko | A47C 7/383 297/397 |
| 3,185,523 | A | * | 5/1965 | Morrill, Jr. | B60N 2/7035 297/226 |
| 3,292,973 | A | * | 12/1966 | Cogut | A47C 7/38 297/397 |
| 4,232,899 | A | * | 11/1980 | Fister, Jr. | A47C 31/023 297/229 |
| 4,718,721 | A | * | 1/1988 | Pompa | B60N 2/6063 297/224 |
| 4,969,683 | A | * | 11/1990 | Wallace | B60N 2/6027 297/219.1 |
| 5,147,110 | A | * | 9/1992 | Syers | B60N 2/882 297/397 |

(Continued)

FOREIGN PATENT DOCUMENTS

| CN | 2362740 | 2/2000 |
| CN | 207140879 | 3/2018 |

(Continued)

*Primary Examiner* — Syed A Islam
(74) *Attorney, Agent, or Firm* — Barnes & Thornburg LLP (57) ABSTRACT

An occupant support includes a vehicle seat and an occupant support covering. The occupant-support covering may be configured to be selectively installed on the vehicle seat and an option of a user.

19 Claims, 5 Drawing Sheets

(56) References Cited

U.S. PATENT DOCUMENTS

| | | | | |
|---|---|---|---|---|
| 5,265,933 A * | 11/1993 | Croshaw | ............... | B60N 2/6063 |
| | | | | 297/228.1 |
| 6,764,134 B1 * | 7/2004 | Crescenzi | ............... | A47C 31/00 |
| | | | | 2/69 |
| 7,607,732 B2 * | 10/2009 | Beroth | ................. | B60N 2/6054 |
| | | | | 297/219.1 |
| 7,677,662 B2 * | 3/2010 | Thompson | ............. | A47C 31/11 |
| | | | | 297/188.01 |
| 8,393,675 B2 * | 3/2013 | Swanson | ................ | A47C 31/11 |
| | | | | 297/226 |
| 9,308,845 B2 * | 4/2016 | Cortellazzi | .......... | B60N 2/6027 |
| 9,327,629 B2 * | 5/2016 | Huebner | ................... | B60N 2/60 |
| 9,669,742 B1 * | 6/2017 | Bailey | .................. | B60N 2/5816 |
| 2003/0218367 A1 * | 11/2003 | Parker | ................ | B60N 2/6027 |
| | | | | 297/229 |
| 2015/0264887 A1 * | 9/2015 | Parness | ................ | A01K 1/0272 |
| | | | | 297/180.14 |
| 2016/0023582 A1 * | 1/2016 | Looper | ................ | B60N 2/6063 |
| | | | | 297/220 |
| 2017/0253159 A1 * | 9/2017 | Lopatin | ............... | B60N 2/6063 |

FOREIGN PATENT DOCUMENTS

| | | |
|---|---|---|
| JP | 2010233591 | 10/2010 |
| JP | 2011078452 | 4/2011 |

* cited by examiner

SEAT COVER

BACKGROUND

The present disclosure relates to an occupant support, and particularly to an occupant support including a vehicle seat. More particularly, the present disclosure relates to an occupant support including an occupant-support covering for the vehicle seat.

SUMMARY

According to the present disclosure, an occupant support includes a vehicle seat and an occupant-support covering. The occupant-support covering is configured to be selectively installed on the vehicle seat at an option of a user.

In the illustrative embodiments, the vehicle seat includes a seat bottom, a seat back coupled to the seat bottom and arranged to extend upwardly and away from the seat bottom and move relative to the seat bottom, and a seat bight defined between the seat back and the seat bottom. The occupant-support covering is coupled to the seat back, the seat bottom, and the seat bight to maintain tension in the occupant-support covering during use by the user.

In the illustrative embodiments, the occupant-support covering includes a seat-back cover coupled to the seat back of the vehicle seat to cover at least a portion of the seat back, a seat-bottom cover coupled to the seat bottom of the vehicle seat to cover at least a portion of the seat bottom, and a cover retainer coupled to the seat bight of the vehicle seat and configured to couple the seat-back cover to the seat-bottom cover.

In the illustrative embodiments, the cover retainer includes a bridge arranged to extend between and interconnect the seat-back cover and the seat-bottom cover, a deformable bight anchor located in the seat bight of the vehicle seat in a spaced-apart relation to the bridge and configured to anchor the seat-bottom cover and the seat-back cover to the vehicle seat at the seat bight by engaging the seat back, seat bottom, and the anchor tether, and an anchor tether configure to extend between and interconnect the bride and the deformable bight anchor.

In the illustrative embodiments, the deformable bight anchor includes a first bight anchor portion and a second bight anchor portion that extends from the first bight anchor portion.

In illustrative embodiments, the deformable bight anchor changes in shape during installation use of the occupant-support covering. The deformable bight anchor has an un-installed shape prior to installation of the deformable bight anchor in the seat bight of the vehicle seat. After installation, the deformable bight anchor has an installed shape and engages the seat back, seat bottom, and the anchor tether.

In the illustrative embodiments, the deformable bight anchor also changes in shape during use of the occupant-support covering. During use of the occupant-support covering, the deformable bight anchor engages the seat back, seat bottom, and the anchor tether by deforming from the installed shape to a deformed shaped in response to application of an external load to the occupant-support covering by the user resting on the occupant support. After removal of the external load, the deformable bight anchor returns to the installed shaped so that tension is maintained on the seat-bottom cover and the seat-back cover.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIGS. 4-7 are a series of views showing installation and use of the occupant-support covering on the vehicle and suggesting how the deformable bight anchor changes in shape during use;

DETAILED DESCRIPTION

Figure 1:
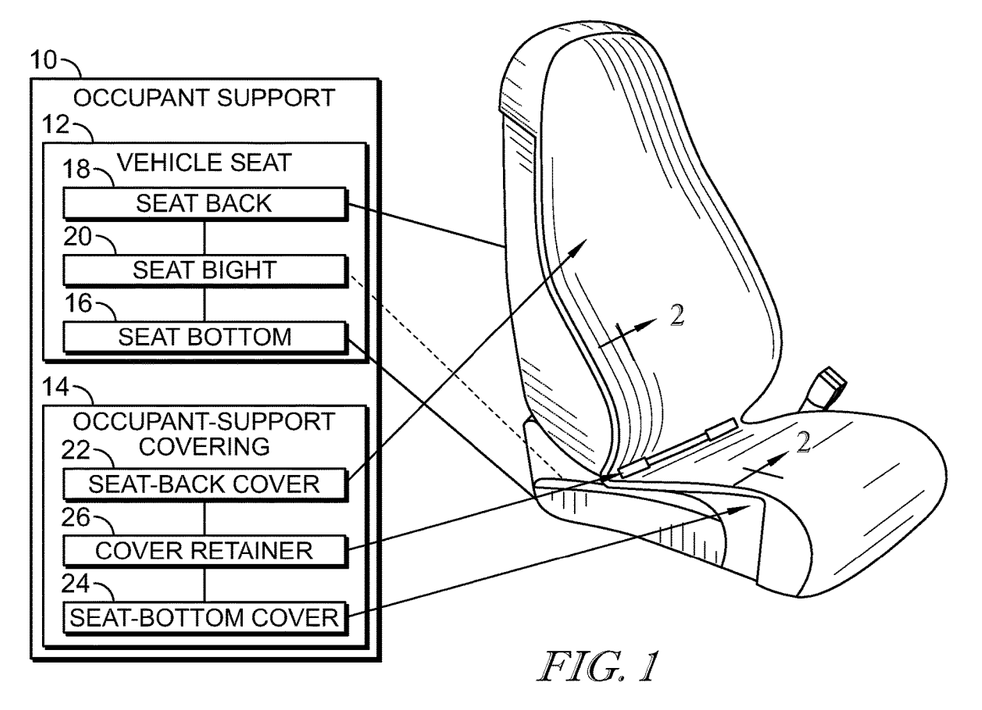
FIG. 1 is a diagrammatic and perspective view of an occupant support including a vehicle seat comprising a seat bottom, a seat back, and a seat bight located between the seat bottom and the seat back and an occupant-support covering comprising a seat-back cover, a seat-bottom cover, and a cover retainer.

A first embodiment of an occupant support 10 is shown in FIGS. 1-10. The occupant support 10 includes a vehicle seat 12 and an occupant-support covering 14 coupled to the vehicle seat 12 as shown in FIG. 1. The occupant-support covering 14 includes a deformable bight anchor 30 configured to change in shape during installation and use on the vehicle seat. A second embodiment of an occupant support 110 is shown in FIG. 11.

Figure 2:
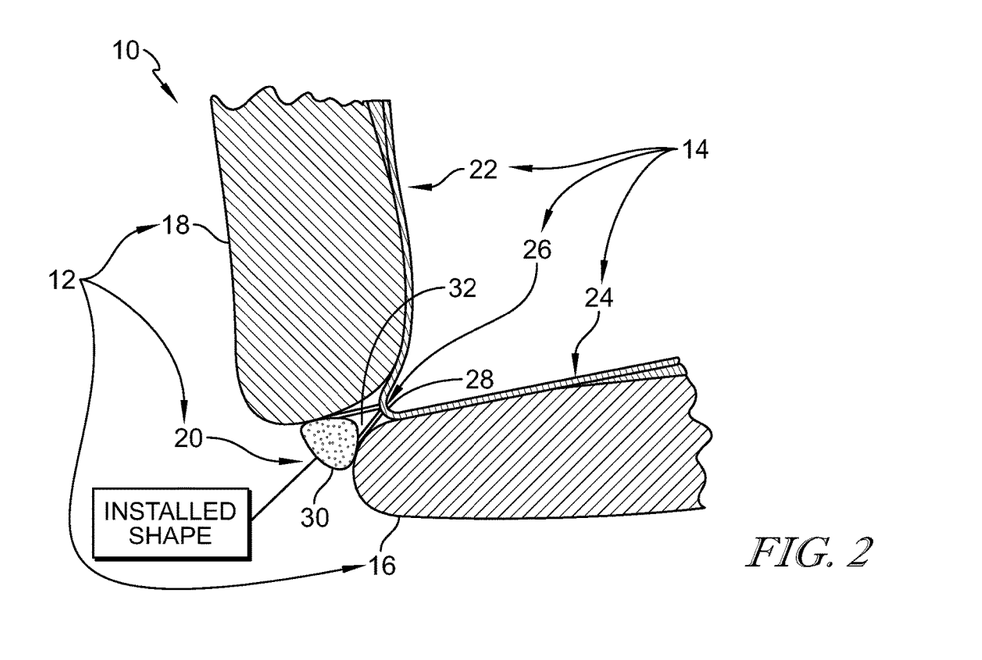
FIG. 2 is a sectional view taken along line 2-2 of FIG. 1 showing the cover retainer includes a bridge arranged to extend between and interconnect the seat-bottom cover and the seat-back cover, a deformable bight anchor configured to retain the seat-anchor retainer to a seat-bight included in the vehicle seat, and an anchor tether arranged to extend between and interconnect the deformable bight anchor to the bridge.

An occupant support 10 includes a vehicle seat 12 and an occupant-support covering 14 as shown in FIGS. 1 and 2. The occupant-support covering 14 is configured to be selectively installed on the vehicle seat 12 and an option of a user. The occupant-support covering 14 is installed as suggested in FIGS. 4-7 and allows for tension to be maintained in the occupant-support covering without the use of straps engaging a rear surface of the vehicle seat 12.

The vehicle seat 12 includes a seat bottom 16, a seat back 18, and a seat bight 20 as shown in FIG. 1. The seat back 18 is coupled to the seat bottom 16 and arranged to extend upwardly and away from the seat bottom 16 and move relative to the seat bottom 16. The seat bottom 16 and the seat back 18 come together to define the seat bight 20 therebetween. The occupant-support covering 14 is coupled to the seat back 18, seat bottom 16, and seat bight 20 to maintain tension in the occupant-support covering 14 during use by the user.

Figure 3:
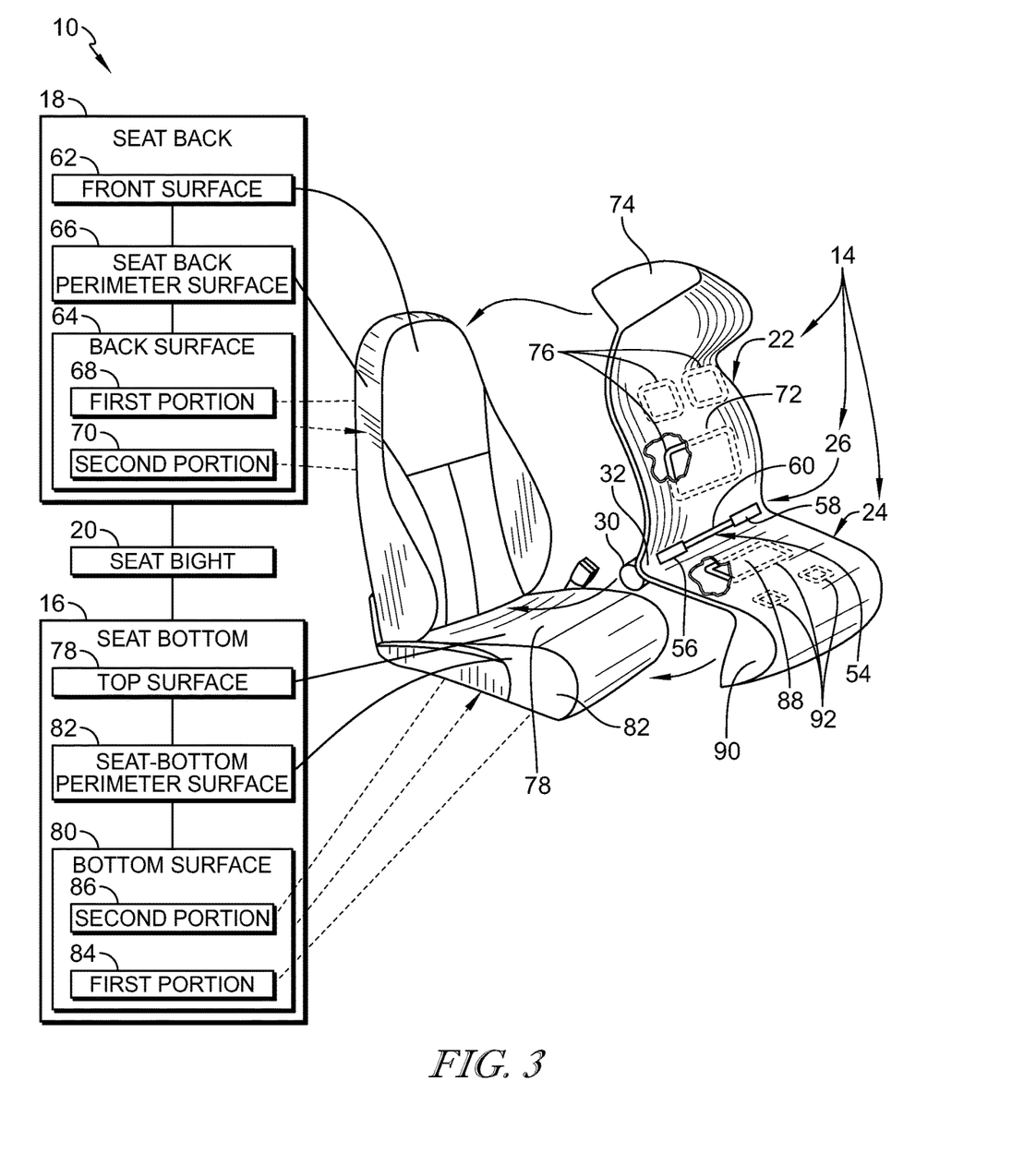
FIG. 3 is a diagrammatic and perspective view similar to FIG. 1 showing the occupant-support covering in a spaced-apart relation to the vehicle seat and showing, with portions broken away, that the occupant-support covering includes several grips configured to engage a front surface of the vehicle seat to minimize sliding of the occupant-support covering on the vehicle seat.

The occupant-support covering 14 includes a seat-back cover 22, a seat-bottom cover 24, and a cover retainer 26 as shown in FIGS. 1-3. The seat-back cover 22 is coupled to the seat back 18 of the vehicle seat 12 to cover at least a portion of the seat back 18. The seat-bottom cover 24 is coupled to the seat bottom 16 of the vehicle seat 12 to cover at least a portion of the seat bottom 16. The cover retainer 26 is couples the seat-back cover 22 to the seat-bottom cover 24 and is coupled to the seat bight 20 of the vehicle seat 12.

The cover retainer 26 includes a bridge 28, a deformable bight anchor 30, and an anchor tether 32 as shown in FIG. 2. The bridge 28 is arranged to extend between and interconnect the seat-back cover 22 and the seat-bottom cover 24. The deformable bight anchor 30 is located in the seat-bight 20 of the vehicle seat 12 and spaced apart from the bridge 28. The deformable bight anchor 30 is configured to anchor the seat-bottom cover 24 and the seat-back cover 22 to the vehicle seat 12 at the seat bight 20 by engaging the seat back 18, the seat bottom 16, and the anchor tether 32. The anchor tether 32 is configured to extend between and interconnect the deformable bight anchor 30.

Figure 8:
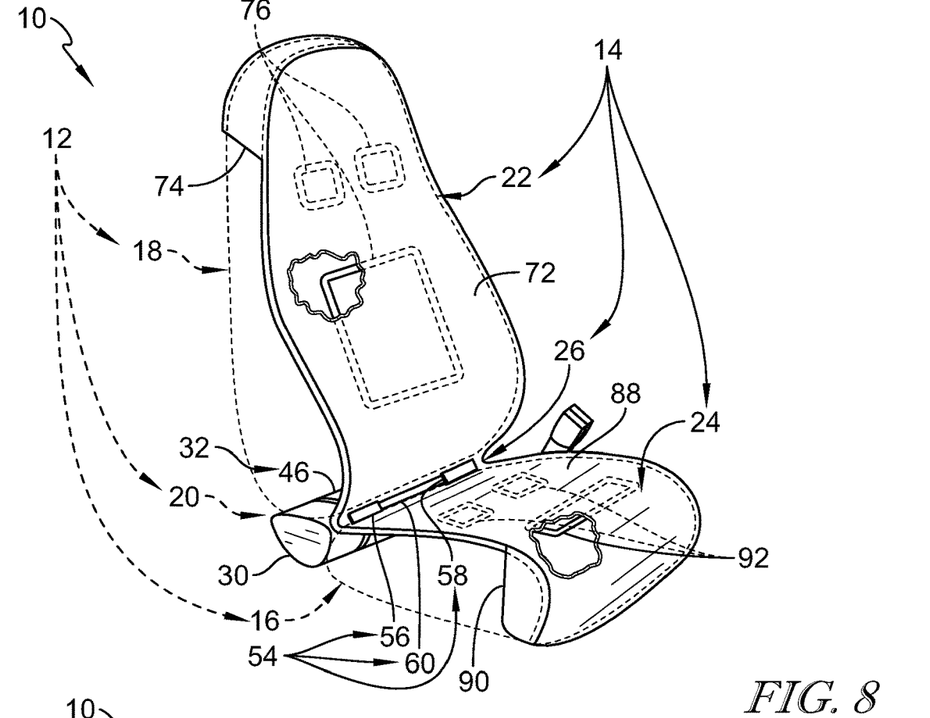
FIG. 8 is a front perspective view of the occupant-support covering showing the occupant-support covering further includes a removal handle coupled to the deformable bight anchor.

The deformable bit anchor 30 includes a first bight anchor portion 40 and a second bight anchor portion 42 as shown in FIG. 8. The second bight anchor portion 42 extends from the first bight anchor portion 40.

Figure 4:
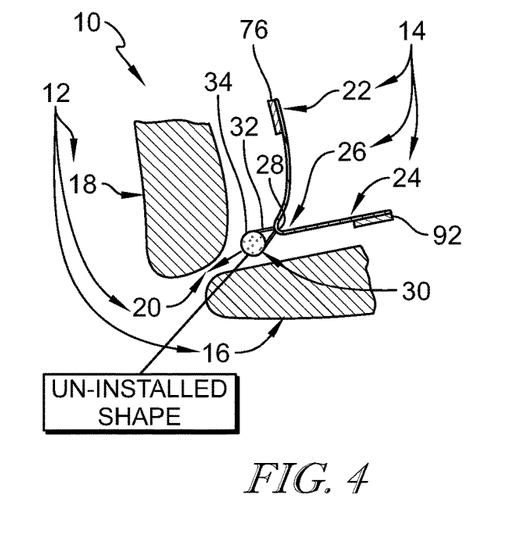
FIG. 4 is a view similar to FIG. 2 showing the deformable bight anchor in an un-installed shape prior to inserting the deformable bight anchor into the seat bight of the vehicle seat.
Figure 5:
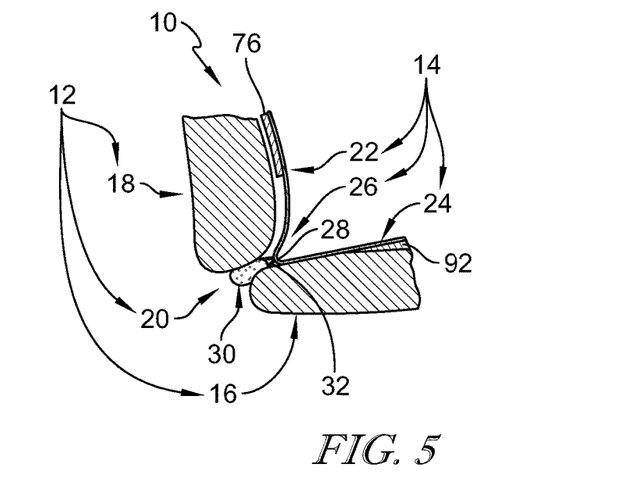
FIG. 5 is a view similar to FIG. 4 showing the deformable bight anchor changing from the un-installed shape to an installed shape when the deformable bight anchor is inserted into the seat bight of the vehicle seat.
Figures 6, 7:
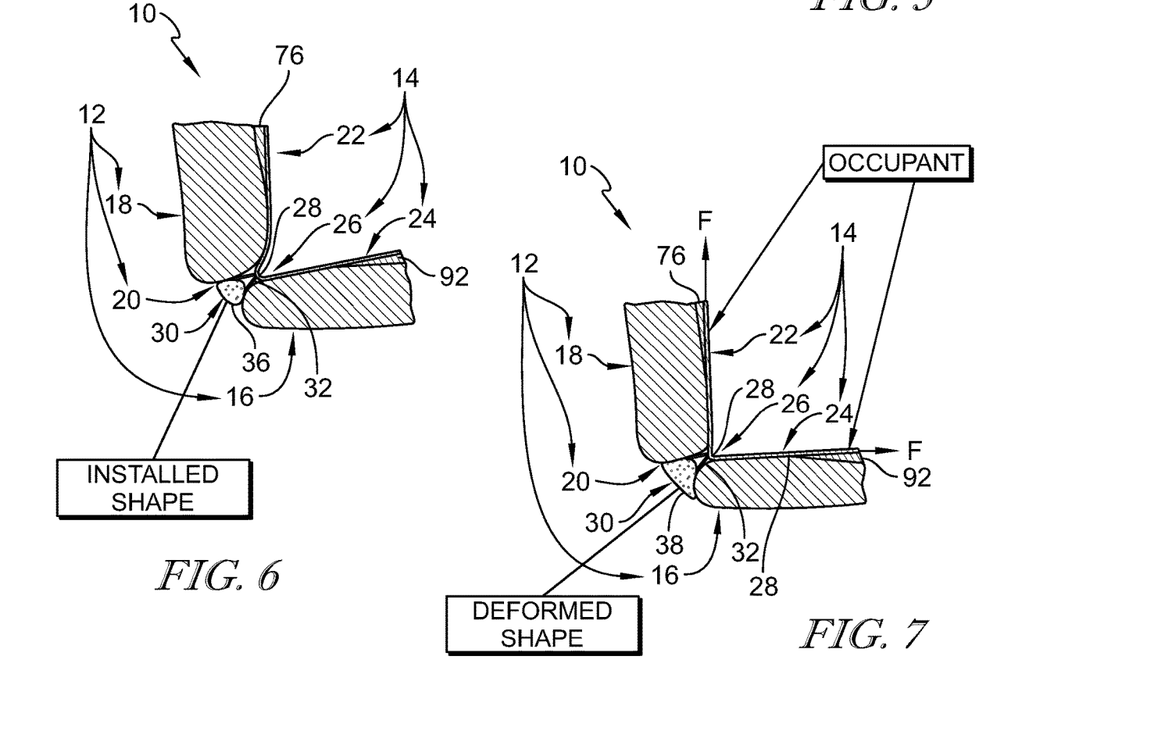
FIG. 6 is view similar to FIG. 5 showing the deformable bight anchor in the installed shape after inserting the deformable bight anchor in the seat bight of the vehicle seat.
FIG. 7 is a view similar to FIG. 6 showing the deformable bight anchor in a deformed shape after an external load is applied to the occupant-support cover by an occupant.

The deformable bight anchor 30 changes in shape during installation use as shown in FIGS. 4-6. The deformable bight anchor has an un-installed shape prior to installation of the deformable bight anchor 30 in the seat bight 20 of the vehicle seat 12. During installation, as shown in FIG. 6, the deformable bight anchor 30 engages the seat back 18 and the seat bottom 16 by deforming from the un-installed shape to an installed shape. After installation, the deformable bight anchor 30 has the installed shape and engages the seat back 18, seat bottom 16, and the anchor tether 32.

The deformable bight anchor 30 also changes in shape during use of the occupant-support covering 14 as shown in FIG. 7. During use of the occupant-support covering 14, the deformable bight anchor 30 engages the seat back 18, seat bottom 16, and the anchor tether 32 by deforming from the installed shape to a deformed shaped in response to application of the external load F to the occupant-support covering 14 by the user resting on the occupant support 10. After removal of the external load F, the deformable bight anchor 30 returns to the installed shaped so that tension is maintained on the seat-bottom cover 24 and the seat-back cover 22. Tension is maintained on the occupant-support covering 14 during installation on the vehicle seat 12, during application of the external load F, and after removal of the external load F.

The deformable bight anchor 30 has the un-installed shape as shown in FIG. 4. The deformable bight anchor 30 has the un-installed shape 34 when the deformable bight anchor 30 is located in spaced-apart relation to the seat bight 20 of the vehicle seat 12 and disengaged from the seat back 18 and the seat bottom 16. The un-installed shape of the deformable bight anchor 30 has a generally circular cross-sectional shape when viewed from a side of the vehicle seat 12.

The deformable bight anchor 30 has the installed shape as shown in FIG. 6. The deformable bight anchor 30 has the installed shape when located in the seat bight 20 and engaged with the seat back 18, seat bottom 16, and anchor tether 32, but also when an external load F is not applied to the occupant-support covering 14. The installed shape of the deformable bight anchor 30 has a generally trapezoidal shape when viewed from the side of the vehicle seat 12 and when located in the seat bight 20, engaged with the seat back 18, seat bottom 16, and anchor tether 32, and the external load F is not applied to the occupant-support covering 14.

The deformable bight anchor 30 has a deformed shape as shown in FIG. 7. The deformable bight anchor 30 has the deformed shape 38 when located in the seat bight 20 and engaged with the seat back 18, seat bottom 16, and anchor tether 32, but also when the external load F is applied to the occupant-support covering 14. The deformed shape of the deformable bight anchor 30 has a generally triangular shape when viewed from the side of the vehicle seat 12 and when located in the seat bight 20, engaged with the seat back, seat bottom, and anchor tether, and the external load F is applied to the occupant-support covering 14 by the occupant.

In some embodiments, the deformable bight anchor 30 comprises memory foam. In other embodiments, the deformable bight anchor 30 is a pneumatic bladder.

Figure 9:
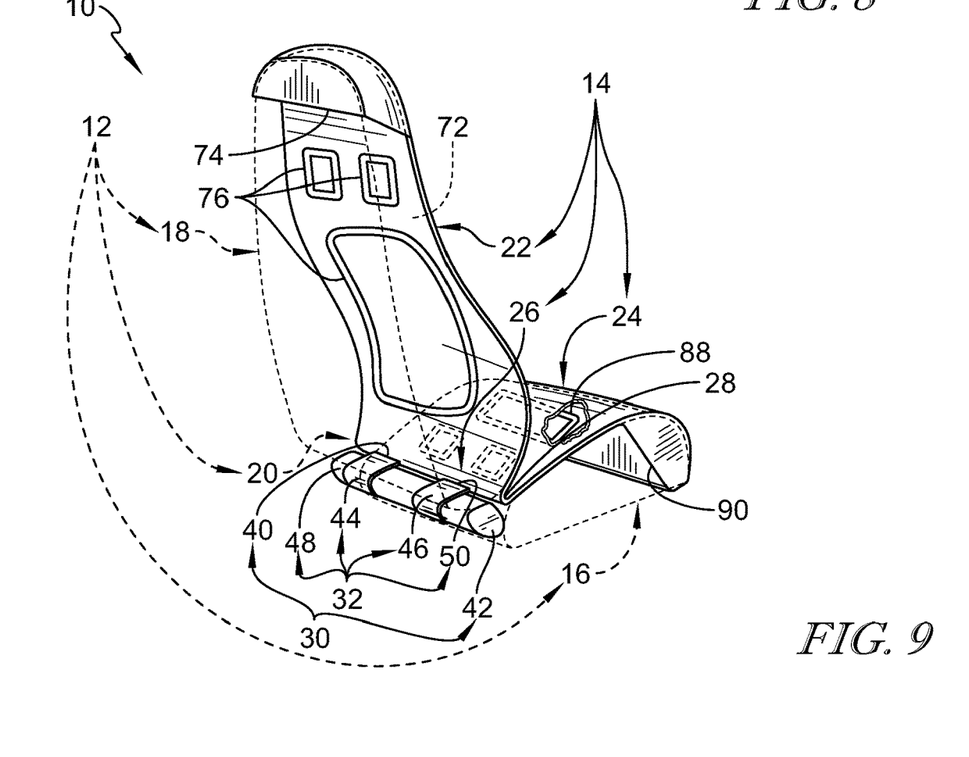
FIG. 9 is a rear perspective view of the occupant-support covering showing the anchor tether includes a first anchor band and a second anchor band both connecting the deformable bight anchor to the bridge.

The anchor tether 32 includes a first anchor band 44, a second anchor band 46, and a first anchor band mount 48 as shown in FIGS. 8 and 9. The first anchor band 44 is arranged to extend away from the bridge 28 of the cover retainer 26 around an outer surface 52 of the deformable bight anchor 30. The second anchor band 46 located in spaced-apart lateral relation from the first anchor band 44 and arranged to extend away from the bridge 28 of the cover retainer 26 around the outer surface 52 of the deformable bight anchor 30. The first anchor band mount 48 is configured to couple the first anchor band 44 to the bridge 28 and the second anchor band 46 to the bridge 28 in a spaced-apart lateral relation to the first anchor band 44.

In the illustrative embodiment, the first anchor band mount 48 is configured to couple the first anchor band 44 to the bridge 28. In other embodiments, the first anchor band 44 extends away from the bridge 28 of the cover retainer 26 around the first bight anchor portion 40 and the second anchor band 46 extends away from the bridge 28 of the cover retainer 26 around the second bight anchor portion 42.

In some embodiments, the anchor tether 32 further includes a second anchor band mount 50 as shown in FIGS. 8 and 9. The second anchor band mount 50 is configured to couple the second anchor band 46 to the bridge 28 in a spaced-apart lateral relation to the first anchor band 44.

The occupant-support covering 14 may further include a removal handle 54 as shown in FIGS. 1, 3 and 8. The removal handle 54 is coupled to the deformable bight anchor 30 and is configured to transmit a removal force to the deformable bight anchor 30 to cause the deformable bight anchor 30 to deform and move from the seat bight 20 of the vehicle seat 12 and disengage the seat back 18 and the seat bottom 16 when an outward force relative to the vehicle seat 12 is applied to the removal handle 54.

In some embodiments, the removal handle 54 may include a first end 56, a second end 58, and a handle grip 60 as shown in FIGS. 1 and 3. The first end 56 is coupled to the deformable bight anchor 30. The second end 58 is in a spaced-apart relation form the first end 56 and is coupled to the deformable bight anchor 30. The handle grip 60 is arranged to extend between and interconnect the first end 56 and the second end 58 and configured to transmit the removal force to the deformable bight anchor 30 to cause the deformable bight anchor 30 to deform and move from the seat bight 20 of the vehicle seat 12 and disengage the seat back 18 and the seat bottom 16 when the outward force relative to the vehicle seat 12 is applied to the handle grip 60.

In other embodiments, the first end 56 of the removal handle 54 is coupled to the first bight anchor portion 40 of the deformable bight anchor 30 and the second end 58 of the removal handle 54 is coupled to the second bight anchor portion 42 of the deformable bight anchor 30. The handle grip 60 is configured to transmit the removal force to the first and second bight anchor portions 40, 42 of the deformable bight anchor 30 to cause the deformable bight anchor 30 to deform and move from the seat bight 20 of the vehicle seat 12 and disengage the seat back 18 and the seat bottom 16 when the outward force relative to the vehicle seat 12 is applied to the handle grip 60.

In some embodiments, the seat back 18 includes a front surface 62, a back surface 64, and a seat-back perimeter surface 66 as shown in FIGS. 1-3. The front surface 62 is adapted to face toward the occupant resting on the occupant support 10. The back surface 64 is arranged to face opposite the front surface 62. The seat-back perimeter surface 66 is arranged to extend between and interconnect the front surface 62 and the back surface 64. The back surface 64 consists of a first portion 68 and a second portion 70 as shown in FIGS. 1 and 2.

The seat-back cover 22 includes a seat-back sheet 72, a seat-back cover retainer 74, and a seat-back grip 76 as shown in FIGS. 8 and 9. The seat-back cover retainer 74 is coupled to the seat-back sheet 72 and is configured to engage the first portion 68 of the back surface 64 without engaging the second portion 70 of the back surface 64. The seat-back grip 76 is coupled to the seat-back sheet 72 and is configured to engage the front surface 62 of the seat back 18 to maintain the position of the seat-back cover 22 on the vehicle seat 12.

In some embodiments, the seat bottom 16 includes a top surface 78, a bottom surface 80, and a seat-bottom perimeter surface 82 as shown in FIGS. 1-3. The top surface 78 is adapted to face toward the occupant resting on the occupant support 10. The bottom surface 80 is arranged to face opposite the top surface 78. The seat-bottom perimeter surface 82 is arranged to extend between and interconnect the top surface 78 and the bottom surface 80. The bottom surface 80 consists a first portion 84 and a second portion 86 as shown in FIGS. 1 and 2.

The seat-bottom cover 24 includes a seat-bottom sheet 88, a seat-bottom cover retainer 90, and a seat-bottom grip 92 as shown in FIGS. 8 and 9. The seat-bottom cover retainer 90 is coupled to the seat-bottom sheet 88 and is configured to engage the first portion 84 of the bottom surface 80 without engaging the second portion 86 of the bottom surface 80. The seat-bottom grip 92 is coupled to the seat-bottom sheet 88 and is configured to engage the top surface 78 of the seat-bottom 16 to maintain the position of the seat-bottom cover 24 on the vehicle seat 12.

A method of using the occupant support 10 includes several steps. The method begins with the vehicle seat 12 and the occupant-support covering 14 as shown in FIG. 3. A user desiring to install the occupant-support covering 14 on the vehicle seat 12 continues the method by coupling the seat-back cover 22 to the seat-back 18 to cause the seat-back cover retainer 74 to engage the first portion 68 of the back surface 64 of the seat back 18 without engaging the second portion 70. The user then couples the seat-bottom cover 24 to the seat-bottom 16 to cause the seat-bottom cover retainer 90 to engage the first portion 84 of the bottom surface 80 of the seat bottom 16 without engaging the second portion 86. The user then inserts the deformable bight anchor 30 of the cover retainer 26 into the seat bight 20 of the vehicle seat 12 to cause the deformable bight anchor 30 to change from the un-installed shape 34 to the installed shape 36 and cause the deformable bight anchor 30 to engage the seat back 18, the seat bottom 16, and the anchor tether 32. The installation of the deformable bight anchor 30 is shown in FIGS. 4-7.

With the deformable bight anchor 30 anchoring the occupant-support covering 14 to the vehicle seat 12, the user then may rest of the occupant support 10. The user resting on the occupant support 10 provides an external load F to the occupant-support covering 14 as shown in FIG. 7. By the user resting on the occupant support 10, the user provides the external load F to the occupant-support covering to cause the deformable bight anchor 30 to anchor the seat-bottom cover 24 and the seat-back cover 22 to the vehicle seat 12 at the seat bight 20 by engaging the seat back 18, the seat bottom 16, and the anchor tether 32 by deforming from the installed shape 36 to the deformed shaped 38. When the user removes the external load F, the deformable bight anchor 30 changes from the deformed shape 38 to the installed shape 36 so that tension is maintained on the seat-bottom cover 24 and the seat-back cover 22. The installed shape 36 of the deformable bight anchor 30 maintains tension on the seat-bottom cover 24 and the seat-back cover 22 during installation on the vehicle seat 12, during application of the external load F, and after removal of the external load F.

A user desiring to remove the deformable bight anchor 30 from the seat bight 20 of the vehicle seat 12 applies an outward force relative to the vehicle seat 12 to the removal handle 54 coupled to the deformable bight anchor 30. The removal handle 54 transmits a removal force to the deformable bight anchor 30 to cause the deformable bight anchor 30 to deform and move from the seat bight 20 of the vehicle seat 12. The deformable bight anchor 30 changes from the installed shape 36 to the un-installed shape 34 to cause the deformable bight anchor 30 to disengage the seat back 18 and the seat bottom 16 when the outward force is applied to the removal handle 54 by the user.

An occupant support 110 a vehicle seat 12 and an occupant-support covering 114 as shown in FIG. 11. The vehicle seat 12 includes a seat bottom 16 and a seat back 18 coupled to the seat bottom 16 extend upwardly and away from the seat bottom 16 and move relative to the seat bottom 16. The seat bottom 16 and the seat back 18 come together to define a seat bight 20 therebetween. The occupant-support covering 114 is arranged to cover the vehicle seat 12.

Figure 10:
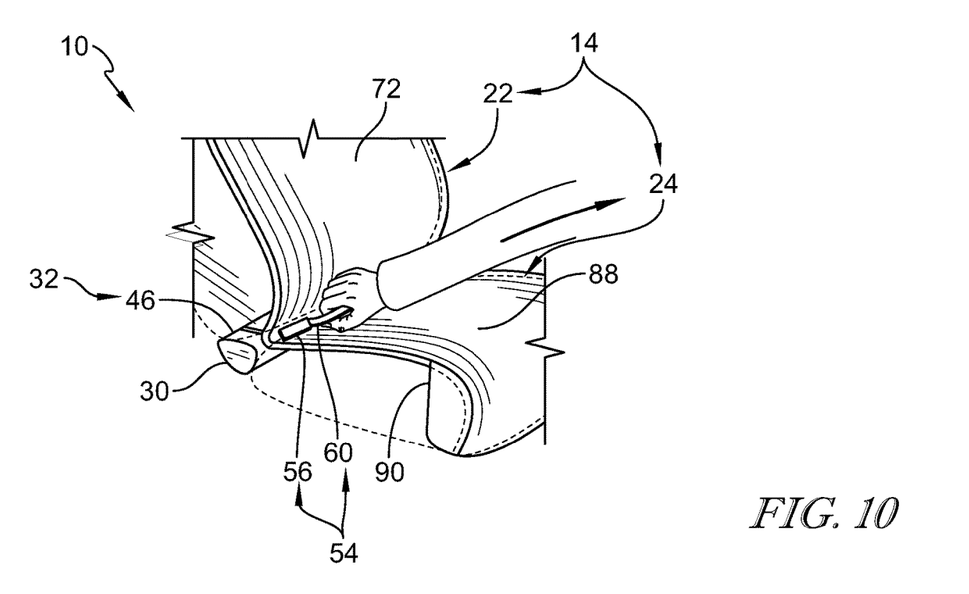
FIG. 10 is a partial perspective view of the occupant-support covering of FIG. 8 showing a user grasping the removal handle and applying a removal force to the handle to cause the deformable bight anchor to deform and move through the seat bight; of the vehicle seat when an outward force relative to the vehicle seat is applied to the handle.
Figure 11:
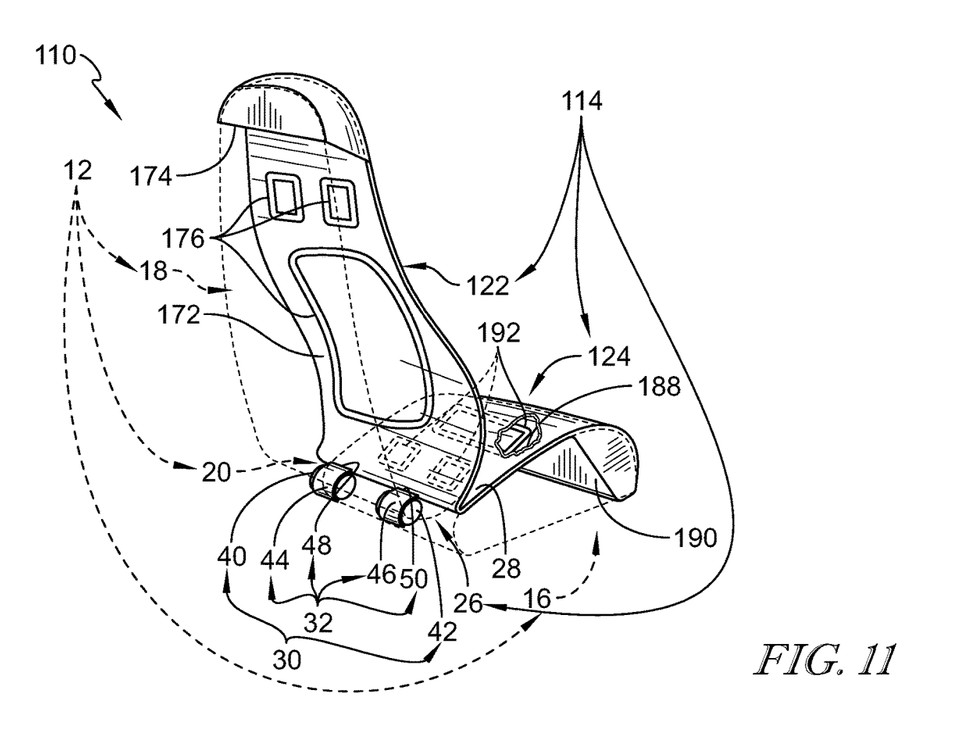
FIG. 11 is a perspective view of another embodiment of an occupant-support covering showing that a deformable bight anchor has two separate anchor portions.

The occupant-support covering 114 includes a seat-back cover 122, a seat-bottom cover 124, and a cover retainer 126 as shown in FIG. 10. The seat-back cover 122 is coupled to the seat back 18 to cover at least a portion of the seat back 18. The seat-bottom cover 124 is coupled to the seat bottom to cover at least a portion of the seat bottom 16. The cover retainer 126 is arranged to connect the seat-back cover 122 to the seat-bottom cover 124.

The cover retainer 126 includes a bridge 128, a deformable bight anchor 130, and an anchor tether 132 as shown in FIG. 11. The bridge 128 is arranged to extend between and interconnect the seat-back cover 122 and the seat-bottom cover 124. The deformable bight anchor 130 is located in the seat-bight 20 of the vehicle seat 12 and spaced apart from the bridge 128. The deformable bight anchor 130 is configured to anchor the seat-bottom cover 124 and the seat-back cover 122 to the vehicle seat 12 at the seat bight 20 by engaging the seat back 18, the seat bottom 16, and the anchor tether 132. The anchor tether 132 is configured to extend between and interconnect the deformable bight anchor 130.

The deformable bight anchor 130 includes a first bight anchor portion 140 and a second bight anchor portion 142 as shown in FIG. 11. The second bight anchor portion 142 is formed separately and located in spaced-apart lateral relation to the first bight anchor portion 140.

The deformable bight anchor 130 changes in shape during installation use as shown in FIGS. 4-6. The deformable bight anchor 130 has an un-installed shape prior to installation of the deformable bight anchor 130 in the seat bight 20 of the vehicle seat 12. During installation, as shown in FIG. 6, the deformable bight anchor 130 engages the seat back 18 and the seat bottom 16 by deforming from the un-installed shape to an installed shape. After installation, the deformable bight anchor 130 has the installed shape and engages the seat back 18, seat bottom 16, and the anchor tether 132.

The deformable bight anchor 130 changes in shape during use of the occupant-support covering 114 as shown in FIG. 7. During use of the occupant-support covering 114, the deformable bight anchor 130 engages the seat back 18, the seat bottom 16, and the anchor tether 132 by deforming from the installed shape to a deformed shape in response to application of the external load F to the occupant-support covering 114 by the user resting on the occupant support 110. After removal of the external load F, the deformable bight anchor 130 returns to the installed shaped so that tension is maintained on the seat-bottom cover 124 and the seat-back cover 122. Tension is maintained on the occupant-support covering 114 during installation on the vehicle seat 12, during application of the external load F, and after removal of the external load F.

The deformable bight anchor 130 has the un-installed shape as shown in FIG. 4. The deformable bight anchor 130 has the un-installed shape 34 when the deformable bight anchor 130 is located in spaced-apart relation to the seat bight 20 of the vehicle seat 12 and disengaged from the seat back 18 and the seat bottom 16. The un-installed shape of the deformable bight anchor 130 has a generally circular cross-sectional shape when viewed from a side of the vehicle seat 12.

The deformable bight anchor 130 has the installed shape as shown in FIG. 6. The deformable bight anchor 130 has the installed shape when located in the seat bight 20 and engaged with the seat back 18, seat bottom 16, and anchor tether 132, but also when an external load F is not applied to the occupant-support covering 114. The installed shape of the deformable bight anchor 130 has a generally trapezoidal shape when viewed from the side of the vehicle seat 12 and when located in the seat bight 20, engaged with the seat back 18, seat bottom 16, and anchor tether 32, and the external load F is not applied to the occupant-support covering 114.

The deformable bight anchor 130 has a deformed shape as shown in FIG. 7. The deformable bight anchor 130 has the deformed shape 38 when located in the seat bight 20 and engaged with the seat back 18, seat bottom 16, and anchor tether 132, but also when the external load F is applied to the occupant-support covering 114. The deformed shape of the deformable bight anchor 130 has a generally triangular shape when viewed from the side of the vehicle seat 12 and when located in the seat bight 20, engaged with the seat back, seat bottom, and anchor tether, and the external load F is applied to the occupant-support covering 114 by the occupant.

In some examples, the deformable bight anchor 30 comprises memory foam. In other examples, the deformable bight anchor 30 is a pneumatic bladder.

The anchor tether 132 includes a first anchor band 144 and a first anchor band mount 48 as shown in FIG. 11. The first anchor band 144 is arranged to extend away from the bridge 128 of the cover retainer 126 around an outer surface 152 of the first bight anchor portion 140 of the deformable bight anchor 30. The first anchor band mount 148 is configured to couple the first anchor band 144 to the bridge 128.

In some embodiments, the anchor tether 132 further includes a second anchor band 146 and a second anchor band mount 150 as shown in FIG. 11. The second anchor band 146 located in spaced-apart lateral relation from the first anchor band 144 and arranged to extend away from the bridge 128 of the cover retainer 126 around the outer surface 152 of the second bight anchor portion 142 of the deformable bight anchor 130. The second anchor band mount 150 is configured to couple the second anchor band 146 to the bridge 28 in a spaced-apart lateral relation to the first anchor band 144.

The occupant-support covering 114 may further include a removal handle 54 as shown in FIGS. 1, 3 and 8. The removal handle 54 is coupled to the deformable bight anchor 130 and is configured to transmit a removal force to the deformable bight anchor 130 to cause the deformable bight anchor 130 to deform and move from the seat bight 20 of the vehicle seat 12 and disengage the seat back 18 and the seat bottom 16 when an outward force relative to the vehicle seat 12 is applied to the removal handle 54.

In the illustrative embodiment, the removal handle 54 includes a first end 56, a second end 58, and a handle grip 60 as shown in FIGS. 1 and 3. The first end 56 is coupled to the first bight anchor portion 140 deformable bight anchor 130. The second end 58 is in a spaced-apart relation form the first end 56 and is coupled to the second bight anchor portion 142 of the deformable bight anchor 130. The handle grip 60 is arranged to extend between and interconnect the first end 56 and the second end 58 and configured to transmit the removal force to the first and second bight anchor portions 40, 42 of the deformable bight anchor 30 to cause the deformable bight anchor 30 to deform and move from the seat bight 20 of the vehicle seat 12 and disengage the seat back 18 and the seat bottom 16 when the outward force relative to the vehicle seat 12 is applied to the handle grip 60.

The seat-back cover 122 includes a seat-back sheet 172, a seat-back cover retainer 174, and a seat-back grip 176 as shown in FIG. 11. The seat-back cover retainer 174 is coupled to the seat-back sheet 172 and is configured to engage the first portion 68 of the back surface 64 without engaging the second portion 70 of the back surface 64. The seat-back grip 176 is coupled to the seat-back sheet 172 and is configured to engage the front surface 162 of the seat back 18 to maintain the position of the seat-back cover 122 on the vehicle seat 12.

The seat-bottom cover 124 includes a seat-bottom sheet 188, a seat-bottom cover retainer 190, and a seat-bottom grip 192 as shown in FIG. 11. The seat-bottom cover retainer 190 is coupled to the seat-bottom sheet 188 and is configured to engage the first portion 84 of the bottom surface 80 without engaging the second portion 86 of the bottom surface 80. The seat-bottom grip 192 is coupled to the seat-bottom sheet 188 and is configured to engage the top surface 78 of the seat-bottom 16 to maintain the position of the seat-bottom cover 124 on the vehicle seat 12.

A method of using the occupant support 110 includes several steps. The method begins with the vehicle seat 12 and the occupant-support covering 114 as shown in FIG. 11. A user desiring to install the occupant-support covering 114 on the vehicle seat 12 continues the method by coupling the seat-back cover 122 to the seat-back 18 to cause the seat-back cover retainer 168 to engage the first portion 68 of the back surface 64 of the seat back 18 without engaging the second portion 86. The user then couples the seat-bottom cover 124 to the seat-bottom 16 to cause the seat-bottom cover retainer 184 to engage the first portion 84 of the bottom surface 80 of the seat bottom 16 without engaging the second portion 86. The user then inserts the first bight anchor portion 140 of the deformable bight anchor 130 into the seat bight 20 of the vehicle seat 12 to cause the first bight anchor portion 140 of the deformable bight anchor 130 to change from the un-installed shape 34 to the installed shape 36 and cause the first bight anchor portion 140 to engage the seat back 18, the seat bottom 16, and the anchor tether 132. The user then inserts the second bight anchor 142 of the deformable bight anchor 130 into the seat bight 20 of the vehicle seat 12 to cause the second bight anchor portion 142 of the deformable bight anchor 130 to change from the un-installed shape 34 to the installed shape 36 and cause the second bight anchor portion 142 to engage the seat back 18, the seat bottom 16, and the anchor tether 132.

With first and second bight anchor portions 140, 142 of the deformable bight anchor 130 anchoring the occupant-support covering 114 to the vehicle seat 12, the user then may rest of the occupant support 110. The user resting on the occupant support 110 provides an external load F to the occupant-support covering 114 as shown in FIG. 3. By the user resting on the occupant support 110, the user provides the external load F to the occupant-support covering to cause first and second bight anchor portions 140, 142 of the deformable bight anchor 130 to anchor the seat-bottom cover 124 and the seat-back cover 122 to the vehicle seat 12 at the seat bight 20 by engaging the seat back 18, the seat bottom 16, and the anchor tether 132 by deforming from the installed shape 36 to the deformed shaped 38. When the user removes the external load, the first and second bight anchor portions 140, 142 of the deformable bight anchor 130 change from the deformed shape 38 to the installed shape 36 so that tension is maintained on the seat-bottom cover 24 and the seat-back cover 22. The installed shape 36 of the deformable bight anchor 30 maintains tension on the seat-bottom cover 124 and the seat-back cover 122 during installation on the vehicle seat 12, during application of the external load, and after removal of the external load.

A user desiring to remove the deformable bight anchor 130 from the seat bight 20 of the vehicle seat 12 applies an outward force relative to the vehicle seat 12 to the removal handle 54 coupled to the deformable bight anchor 130. The removal handle 54 transmits a removal force to the first and second bight anchor portions 140, 142 of the deformable bight anchor 130 to cause the first and second bight anchor portions 140, 142 to deform and move from the seat bight 20 of the vehicle seat 12. The first and second bight anchor portions 140, 142 of the deformable bight anchor 130 change from the installed shape 36 to the un-installed shape 34 to cause the first and second bight anchor portions 140, 142 to disengage the seat back 18 and the seat bottom 16 when the outward force is applied to the removal handle 54 by the user.

In other embodiments, the deformable bight anchor 30, 130 is configured to provide means for anchoring the seat-bottom cover 24, 124 and the seat-back 22, 122 cover to the vehicle seat 12 at the seat bight 20. The deformable bight anchor 30, 130 provides means for anchoring the occupant-support covering 14, 114 to the vehicle seat 12 by engaging the seat back 18, the seat bottom 16, and the anchor tether 32, 132 without the use of a retention strap by deforming from the installed shape to a deformed shaped in response to application of the external load F to the occupant-support covering 14, 114 by an occupant resting on the occupant support 14, 114 and returning to the installed shaped after removal of the external load F so that tension is maintained on the seat-bottom cover 24 and the seat-back cover 22 during installation on the vehicle seat 12, during application of the external load F, and after removal of the external load F.

The following numbered clauses include embodiments that are contemplated and non-limiting:

Clause 1. An occupant support comprising a vehicle seat including a seat bottom and a seat back coupled to the seat bottom to extend upwardly and away from the seat bottom and move relative to the seat bottom, the seat bottom and seat back come together to define a seat bight therebetween.

Clause 2. The occupant support of clause 1, any other clause, or combination of clauses, further comprising an occupant-support covering including a seat-back cover coupled to the seat back to cover at least a portion of the seat back.

Clause 3. The occupant support of clause 2, any other clause, or combination of clauses, wherein the occupant-support cover further includes a seat-bottom cover coupled to the seat bottom to cover at least a portion of the seat bottom.

Clause 4. The occupant support of clause 3, any other clause, or combination of clauses, wherein the occupant-support cover further includes a cover retainer including a bridge arranged to extend between and interconnect the seat-back cover to the seat-bottom cover.

Clause 5. The occupant support of clause 4, any other clause, or combination of clauses, wherein the cover retainer further includes a deformable bight anchor located in the seat bight and spaced apart from the bridge.

Clause 6. The occupant support of clause 5, any other clause, or combination of clauses, wherein the cover retainer further includes an anchor tether configured to extend between and interconnect the deformable bight anchor and the bridge.

Clause 7. The occupant support of clause 6, any other clause, or combination of clauses, wherein the deformable bight anchor has an installed shape when located in the seat bight and configured to engage the seat back, seat bottom, and anchor tether and an external load is not applied to the occupant-support covering.

Clause 8. The occupant support of clause 7, any other clause, or combination of clauses, wherein the deformable bight anchor is configured to anchor the seat-bottom cover and the seat-back cover to the vehicle seat at the seat bight by engaging the seat back, the seat bottom, and the anchor tether by deforming from the installed shape to a deformed shaped in response to application of the external load to the occupant-support covering by an occupant resting on the occupant support and returning to the installed shaped after removal of the external load so that tension is maintained on the seat-bottom cover and the seat-back cover during installation on the vehicle seat, during application of the external load, and after removal of the external load.

Clause 9. The occupant support of clause 8, any other clause, or combination of clauses, wherein the deformable bight anchor has a un-installed shape when the deformable bight anchor is located in spaced-apart relation to the seat bight of the vehicle seat and disengaged from the seat back and the seat bottom.

Clause 10. The occupant support of clause 9, wherein the deformable bight anchor has a generally circular cross-sectional shape when viewed from a side of the vehicle seat when the deformable bight anchor has the un-installed shape.

Clause 11. The occupant support of clause 10, any other clause, or combination of clauses, wherein the deformable bight anchor has a generally trapezoidal shape when viewed from the side of the vehicle seat and when located in the seat bight and engaging the seat back, seat bottom, and anchor tether and the external load is not applied to the occupant-support covering.

Clause 12. The occupant support of clause 11, any other clause, or combination of clauses, wherein the deformable bite anchor has a generally triangular shape when viewed from the side of the vehicle seat and when located in the seat bight and engaging the seat back, seat bottom, and anchor tether and the external load is applied to the occupant-support covering by the occupant.

Clause 13. The occupant support of clause 12, any other clause, or combination of clauses, wherein the deformable bight anchor includes a first bight anchor portion and a second bight portion located in spaced-apart lateral relation to the first bight anchor portion and the first and second bight anchor portions are generally spherical when the deformable bight anchor has the un-installed shape.

Clause 14. The occupant support of clause 13, any other clause, or combination of clauses, wherein the deformable bight anchor comprises memory foam.

Clause 15. The occupant support of clause 13, any other clause, or combination of clauses, wherein the deformable bight anchor is a pneumatic bladder.

Clause 16. The occupant support of clause 13, any other clause, or combination of clauses, wherein the anchor tether includes a first anchor band arranged to extend away from the bridge of the cover retainer around the first bight anchor portion, a second anchor band located in spaced-apart lateral relation from the first anchor band and arranged to extend away from the bridge of the cover retainer around the second bight anchor portion, and a first anchor band mount configured to couple the first anchor band to the bridge and the second anchor band to the bridge in a spaced-apart lateral relation to the first anchor band.

Clause 17. The occupant support of clause 6, any other clause, or combination of clauses, wherein the occupant-support covering further includes a removal handle coupled to the deformable bight anchor and configured to transmit a removal force to the deformable bight anchor to cause the deformable bight anchor to deform and move from the seat bight of the vehicle seat and disengage the seat back and the seat bottom when an outward force relative to the vehicle seat is applied to the removal handle.

Clause 18. The occupant support of clause 17, any other clause, or combination of clauses, wherein the deformable bight anchor has a un-installed shape when the deformable bight anchor is located in spaced-apart relation to the seat bight of the vehicle seat and disengaged from the seat back and the seat bottom and the deformable bight anchor has a generally circular cross-sectional shape when viewed from a side of the vehicle seat when the deformable bight anchor has the un-installed shape, a generally trapezoidal shape when viewed from the side of the vehicle seat and when located in the seat bight and engaging the seat back, seat bottom, and anchor tether and the external load is not applied to the occupant-support covering, and a generally triangular shape when viewed from the side of the vehicle seat and when located in the seat bight and engaging the seat back, seat bottom, and anchor tether and the external load is applied to the occupant-support covering by the occupant.

Clause 19. The occupant support of clause 18, any other clause, or combination of clauses, wherein the deformable bight anchor includes a first bight anchor portion and a second bight anchor portion located in spaced-apart lateral relation to the first bight anchor portion and the first and second bight anchor pieces are generally spherical when the deformable bight anchor has the un-installed shape and wherein the deformable bight anchor comprises memory foam.

Clause 20. The occupant support of clause 19, any other clause, or combination of clauses, wherein the anchor tether includes a first anchor band arranged to extend away from the bridge of the cover retainer around an outer surface of the deformable bight anchor and a first anchor band mount configured to couple the first anchor band to the bridge of the cover retainer.

Clause 21. The occupant support of clause 20, any other clause, or combination of clauses, wherein the anchor tether further includes a second anchor band located in spaced-apart lateral relation to the first anchor band and arranged to extend away from the bridge of the cover retainer around the outer surface of the deformable bight anchor and a second anchor band mount configured to couple the second anchor band to the bridge of the cover retainer in a spaced apart lateral relation to the first anchor band mount.

Clause 22. The occupant support of clause 21, any other clause, or combination of clauses, wherein the seat back includes a front surface adapted to face toward the occupant resting on the occupant support, a back surface arranged to face opposite the front surface, and a seat-back perimeter surface arranged to extend between and interconnect the front surface and the back surface.

Clause 23. The occupant support of clause 22, any other clause, or combination of clauses, wherein the back surface consists of a first portion and a second portion.

Clause 24. The occupant support of clause 23, any other clause, or combination of clauses, wherein the seat-back cover includes a seat-back sheet, a seat-back cover retainer coupled to the seat-back sheet and configured to engage the first portion of the back surface without engaging the second portion of the back surface, and a seat-back grip coupled to the seat-back sheet and configured to engage the front surface of the seat back to maintain the position of the seat-back cover on the vehicle seat.

Clause 25. The occupant support of clause 24, any other clause, or combination of clauses, where in the seat bottom includes a top surface adapted to face toward the occupant resting on the occupant support, a bottom surface arranged to face opposite the top surface, and a seat-bottom perimeter surface arranged to extend between and interconnect the top surface and the bottom surface.

Clause 26. The occupant support of clause 25, any other clause, or combination of clauses, wherein the bottom surface consisting a first portion and a second portion.

Clause 27. The occupant support of clause 26, any other clause, or combination of clauses, wherein the seat-bottom cover includes a seat-bottom sheet, a seat-bottom cover retainer coupled to the seat-bottom sheet and configured to engage the first portion of the bottom surface without engaging the second portion of the bottom surface, and a seat-bottom grip coupled to the seat-bottom sheet and configured to engage the top surface of the seat-bottom to maintain the position of the seat-bottom cover on the vehicle seat.

Clause 28. An occupant support comprising
a vehicle seat including a seat bottom and a seat back coupled to the seat bottom to extend upwardly and away from the seat bottom and move relative to the seat bottom, the seat bottom and seat back come together to define a seat bight therebetween.

Clause 29. The occupant support of clause 28, any other clause, or combination of clauses, wherein the occupant support further comprises an occupant-support covering including a seat-back cover coupled to the seat back to cover at least a portion of the seat back.

Clause 30. The occupant support of clause 29, any other clause, or combination of clauses, wherein the occupant-support covering further includes a seat-bottom cover coupled to the seat bottom to cover at least a portion of the seat bottom.

Clause 31. The occupant support of clause 30, any other clause, or combination of clauses, wherein the occupant-support covering further includes a cover retainer including a bridge arranged to extend between and interconnect the seat-back cover to the seat-bottom cover.

Clause 32. The occupant support of clause 31, any other clause, or combination of clauses, wherein the cover retainer further includes a deformable bight anchor located in the seat bight and spaced apart from the bridge.

Clause 33. The occupant support of clause 32, any other clause, or combination of clauses, wherein the cover retainer further includes an anchor tether configured to extend between and interconnect the deformable bight anchor and the bridge, Clause 34. The occupant support of clause 33, any other clause, or combination of clauses, wherein the deformable bight anchor has an installed shape when located in the seat bight and configured to engage the seat back, seat bottom, and anchor tether and an external load is not applied to the occupant-support covering.

Clause 35. The occupant support of clause 34, any other clause, or combination of clauses, wherein the deformable bight anchor is configured to provide means for anchoring the seat-bottom cover and the seat-back cover to the vehicle seat at the seat bight by engaging the seat back, the seat bottom, and the anchor tether without the use of a retention strap by deforming from the installed shape to a deformed shaped in response to application of the external load to the occupant-support covering by an occupant resting on the occupant support and returning to the installed shaped after removal of the external load so that tension is maintained on the seat-bottom cover and the seat-back cover during installation on the vehicle seat, during application of the external load, and after removal of the external load.

Clause 36. An occupant-support covering comprising a seat-back cover.

Clause 37. The occupant-support covering of clause 36, any other clause, or combination of clauses, wherein the occupant-support covering further includes a seat-bottom cover.

Clause 38. The occupant-support covering of clause 37, any other clause, or combination of clauses, wherein the occupant-support covering further includes a cover retainer including a bridge arranged to extend between and interconnect the seat-back cover to the seat-bottom cover.

Clause 39. The occupant-support covering of clause 38, any other clause, or combination of clauses, wherein the cover retainer further includes a deformable bight anchor spaced apart from the bridge.

Clause 40. The occupant-support covering of clause 39, any other clause, or combination of clauses, wherein the cover retainer further includes an anchor tether configured to extend between and interconnect the deformable bight anchor and the bridge.

Clause 41. The occupant-support covering of clause 40, any other clause, or combination of clauses, wherein the deformable bight anchor is configured to change between an un-installed shape in which the deformable bight anchor has a generally circular cross-sectional shape when viewed from a side of the deformable bight anchor an installed, un-loaded shape in which the deformable bight anchor has a generally trapezoidal shape when viewed from the side of the deformable bight anchor and when a load is not applied to the occupant-support covering, and a deformed shaped in which the deformable bight anchor has a generally triangular shape when viewed from the side of the deformable bight anchor and the is applied to the occupant-support covering, and further configured to return from the deformed shape to the installed, un-loaded shape in response to removal of the load.

The invention claimed is:
1. An occupant support consisting of
a vehicle seat including a seat bottom and a seat back coupled to the seat bottom to extend upwardly and away from the seat bottom and move relative to the seat bottom, the seat bottom and seat back come together to define a seat bight therebetween and
an occupant-support covering including a seat-back cover coupled to the seat back to cover at least a portion of the seat back, a seat-bottom cover coupled to the seat bottom to cover at least a portion of the seat bottom, and a cover retainer including a bridge arranged to extend between and interconnect the seat-back cover to the seat-bottom cover, a deformable bight anchor located in the seat bight and spaced apart from the bridge, and an anchor tether configured to extend between and interconnect the deformable bight anchor and the bridge,
wherein the deformable bight anchor has an installed shape when located in the seat bight and configured to engage the seat back, seat bottom, and anchor tether and an external load is not applied to the occupant-support covering, the deformable bight anchor is configured to anchor the seat-bottom cover and the seat-back cover to the vehicle seat at the seat bight by engaging the seat back, the seat bottom, and the anchor tether by deforming from the installed shape to a deformed shaped in response to application of the external load to the occupant-support covering by an occupant resting on the occupant support and returning to the installed shaped after removal of the external load so that tension is maintained on the seat-bottom cover and the seat-back cover during installation on the vehicle seat, during application of the external load, and after removal of the external load, and wherein the occupant-support covering further includes a removal handle coupled to the deformable bight anchor and configured to transmit a removal force to the deformable bight anchor to cause the deformable bight anchor to deform and move from the seat bight of the vehicle seat and disengage the seat back and the seat bottom when an outward force relative to the vehicle seat is applied to the removal handle, the removal handle including a first end coupled to the bridge of the cover retainer, a second end spaced-apart in relation to the first end and coupled to the bridge of the cover retainer, and a hand grip arranged to extend between and interconnect the first end and the second end and configured to transmit the removal force.

2. The occupant support of claim 1, wherein the deformable bight anchor has a un-installed shape when the deformable bight anchor is located in spaced-apart relation to the seat bight of the vehicle seat and disengaged from the seat back and the seat bottom and the deformable bight anchor has a generally circular cross-sectional shape when viewed from a side of the vehicle seat when the deformable bight anchor has the un-installed shape.

3. The occupant support of claim 2, wherein the deformable bight anchor has a generally trapezoidal shape when viewed from the side of the vehicle seat and when located in the seat bight and engaging the seat back, seat bottom, and anchor tether and the external load is not applied to the occupant-support covering and a generally triangular shape when viewed from the side of the vehicle seat and when located in the seat bight and engaging the seat back, seat bottom, and anchor tether and the external load is applied to the occupant-support covering by the occupant.

4. The occupant support of claim 3, wherein the deformable bight anchor includes a first bight anchor portion and a second bight portion located in spaced-apart lateral relation to the first bight anchor portion and the first and second bight anchor portions are generally spherical when the deformable bight anchor has the un-installed shape.

5. The occupant support of claim 4, wherein the deformable bight anchor comprises memory foam.

6. The occupant support of claim 4, wherein the deformable bight anchor is a pneumatic bladder.

7. The occupant support of claim 4, wherein the anchor tether includes a first anchor band arranged to extend away from the bridge of the cover retainer around the first bight anchor portion, a second anchor band located in spaced-apart lateral relation from the first anchor band and arranged to extend away from the bridge of the cover retainer around the second bight anchor portion, and a first anchor band mount configured to couple the first anchor band to the bridge and the second anchor band to the bridge in a spaced-apart lateral relation to the first anchor band.

8. The occupant support of claim 1, wherein the deformable bight anchor has a un-installed shape when the deformable bight anchor is located in spaced-apart relation to the seat bight of the vehicle seat and disengaged from the seat back and the seat bottom and the deformable bight anchor has a generally circular cross-sectional shape when viewed from a side of the vehicle seat when the deformable bight anchor has the un-installed shape, a generally trapezoidal shape when viewed from the side of the vehicle seat and when located in the seat bight and engaging the seat back, seat bottom, and anchor tether and the external load is not applied to the occupant-support covering, and a generally triangular shape when viewed from the side of the vehicle seat and when located in the seat bight and engaging the seat back, seat bottom, and anchor tether and the external load is applied to the occupant-support covering by the occupant.

9. The occupant support of claim 8, wherein the deformable bight anchor includes a first bight anchor portion and a second bight anchor portion located in spaced-apart lateral relation to the first bight anchor portion and the first and second bight anchor pieces are generally spherical when the deformable bight anchor has the un-installed shape and wherein the deformable bight anchor comprises memory foam.

10. The occupant support of claim 9, wherein the anchor tether includes a first anchor band arranged to extend away from the bridge of the cover retainer around an outer surface of the deformable bight anchor and a first anchor band mount configured to couple the first anchor band to the bridge of the cover retainer.

11. The occupant support of claim 10, wherein the anchor tether further includes a second anchor band located in spaced-apart lateral relation to the first anchor band and arranged to extend away from the bridge of the cover retainer around the outer surface of the deformable bight anchor and a second anchor band mount configured to couple the second anchor band to the bridge of the cover retainer in a spaced apart lateral relation to the first anchor band mount.

12. The occupant support of claim 11, wherein the seat back includes a front surface adapted to face toward the occupant resting on the occupant support, a back surface arranged to face opposite the front surface, and a seat-back perimeter surface arranged to extend between and interconnect the front surface and the back surface, the back surface consists of a first portion and a second portion and the seat-back cover includes a seat-back sheet, a seat-back cover retainer coupled to the seat-back sheet and configured to engage the first portion of the back surface without engaging the second portion of the back surface, and a seat-back grip coupled to the seat-back sheet and configured to engage the front surface of the seat back to maintain the position of the seat-back cover on the vehicle seat.

13. The occupant support of claim 12, wherein the seat bottom includes a top surface adapted to face toward the occupant resting on the occupant support, a bottom surface arranged to face opposite the top surface, and a seat-bottom perimeter surface arranged to extend between and interconnect the top surface and the bottom surface, the bottom surface consisting a first portion and a second portion and the seat-bottom cover includes a seat-bottom sheet, a seat-bottom cover retainer coupled to the seat-bottom sheet and configured to engage the first portion of the bottom surface without engaging the second portion of the bottom surface, and a seat-bottom grip coupled to the seat-bottom sheet and configured to engage the top surface of the seat-bottom to maintain the position of the seat-bottom cover on the vehicle seat.

14. The occupant support of claim 2, wherein the anchor tether includes a first anchor band arranged to extend away from the bridge of the cover retainer around an outer surface of the deformable bight anchor and a first anchor band mount configured to couple the first anchor band to the bridge of the cover retainer.

15. The occupant support of claim 14, wherein the anchor tether further includes a second anchor band located in spaced-apart lateral relation to the first anchor band and arranged to extend away from the bridge of the cover retainer a round the outer surface of the deformable bight anchor and a second anchor band mount configured to couple the second anchor band to the bridge of the cover retainer in a spaced apart lateral relation to the first anchor band mount.

16. The occupant support of claim 15, wherein the seat back includes a front surface adapted to face toward an occupant resting on the occupant support, a back surface arranged to face opposite the front surface, and a seat-back perimeter surface arranged to extend between and interconnect the front surface and the back surface, the back surface consists of a first portion and a second portion and the seat-back cover includes a seat-back sheet, a seat-back cover retainer coupled to the seat-back sheet and configured to engage the first portion of the back surface without engaging the second portion of the back surface, and a seat-back grip coupled to the seat-back sheet and configured to engage the front surface of the seat back to maintain the position of the seat-back cover on the vehicle seat.

17. The occupant support of claim 16, where in the seat bottom includes a top surface, a bottom surface opposite the top surface, and a seat-bottom perimeter surface extending between and interconnecting the top surface to the bottom surface, the bottom surface consisting a first portion and a second portion and wherein the seat-bottom cover includes a seat-bottom sheet, a seat-bottom cover retainer coupled to the seat-bottom sheet and configured to engage the first portion of the bottom surface without engaging the second portion of the bottom surface, and a seat bottom grip coupled to the seat-bottom sheet configured to engage the top surface of the seat-bottom to maintain the position of the seat-bottom cover on the vehicle seat.

18. An occupant support comprising
a vehicle seat including a seat bottom and a seat back coupled to the seat bottom to extend upwardly and away from the seat bottom and move relative to the seat bottom, the seat bottom and seat back come together to define a seat bight therebetween and
an occupant-support covering including a seat-back cover coupled to the seat back to cover at least a portion of the seat back, a seat-bottom cover coupled to the seat bottom to cover at least a portion of the seat bottom, and a cover retainer including a bridge arranged to extend between and interconnect the seat-back cover to the seat-bottom cover, a deformable bight anchor located in the seat bight and spaced apart from the bridge, and an anchor tether configured to extend between and interconnect the deformable bight anchor and the bridge,
wherein the seat back includes a front surface adapted to face toward the occupant resting on the occupant support, a back surface arranged to face opposite the front surface, and a seat-back perimeter surface arranged to extend between and interconnect the front surface and the back surface, the back surface consists of a first portion and a second portion and the seat-back cover includes a seat-back sheet, a seat-back cover retainer coupled to the seat-back sheet and configured to engage the first portion of the back surface without engaging the second portion of the back surface, and a plurality of seat-back grips spaced-apart in relation to one another and coupled to the seat-back sheet, the plurality of seat-back grips are configured to engage the front surface of the seat back to maintain the position of the seat-back cover on the vehicle seat,
wherein the seat bottom includes a top surface adapted to face toward the occupant resting on the occupant support, a bottom surface arranged to face opposite the top surface, and a seat-bottom perimeter surface arranged to extend between and interconnect the top surface and the bottom surface, the bottom surface consisting a first portion and a second portion and the seat-bottom cover includes a seat-bottom sheet, a seat-bottom cover retainer coupled to the seat-bottom sheet and configured to engage the first portion of the bottom surface without engaging the second portion of the bottom surface, and a plurality of seat-bottom grips spaced-apart in relation to one another and coupled to the seat-bottom sheet, the plurality of seat bottom grips are configured to engage the top surface of the seat-bottom to maintain the position of the seat-bottom cover on the vehicle seat,
wherein the deformable bight anchor has an installed shape when located in the seat bight and configured to engage the seat back, seat bottom, and anchor tether and an external load is not applied to the occupant-support covering, the deformable bight anchor is configured to provide means for anchoring the seat-bottom cover and the seat-back cover to the vehicle seat at the seat bight by engaging the seat back, the seat bottom, and the anchor tether without the use of a retention strap by deforming from the installed shape to a deformed shaped in response to application of the external load to the occupant-support covering by an occupant resting on the occupant support and returning to the installed shaped after removal of the external load so that tension is maintained on the seat-bottom cover and the seat-back cover during installation on the vehicle seat, during application of the external load, and after removal of the external load,
wherein the occupant-support covering further includes a removal handle coupled to the deformable bight anchor and configured to transmit a removal force to the deformable bight anchor to cause the deformable bight anchor to deform and move from the seat bight of the vehicle seat and disengage the seat back and the seat bottom when an outward force relative to the vehicle seat is applied to the removal handle, the removal handle including a first end coupled to the bridge of the cover retainer, a second end spaced-apart in relation to the first end and coupled to the bridge of the cover retainer, and a hand grip arranged to extend between and interconnect the first end and the second end and configured to transmit the removal force.

19. An occupant-support covering consisting of
a seat-back cover including a seat-back sheet and a seat-back cover retainer coupled to the seat-back sheet and configured to engage a first portion of a seat-back of a vehicle seat of a without engaging a second portion of the seat-back,
a seat-bottom cover including a seat-bottom sheet and a seat-bottom cover retainer coupled to the seat-bottom sheet and configured to engage a first portion of a seat-bottom without engaging a second portion of the seat-bottom, and
a cover retainer including a bridge arranged to extend between and interconnect the seat-back cover to the seat-bottom cover, a deformable bight anchor spaced apart from the bridge, and an anchor tether configured to extend between and interconnect the deformable bight anchor and the bridge,
wherein the deformable bight anchor is configured to change between an un-installed shape in which the deformable bight anchor has a generally circular cross-sectional shape when viewed from a side of the deformable bight anchor, an installed, un-loaded shape in which the deformable bight anchor has a generally trapezoidal shape when viewed from the side of the deformable bight anchor and when a load is not applied to the occupant-support covering, and a deformed shaped in which the deformable bight anchor has a generally triangular shape when viewed from the side of the deformable bight anchor and the is applied to the occupant-support covering, and further configured to return from the deformed shape to the installed, un-loaded shape in response to removal of the load.

\* \* \* \* \*